(12) United States Patent
Kuo et al.

(10) Patent No.: US 7,324,278 B2
(45) Date of Patent: Jan. 29, 2008

(54) BLACK MATRIX LIGHT GUIDE SCREEN DISPLAY

(76) Inventors: Huei-Pei Kuo, 1501 Page Mill Rd., Palo Alto, CA (US) 94304; Laurence Meade Hubby, Jr., 985 Harriet St., Palo Alto, CA (US) 94301; Steven L. Naberhuis, 4332 NW. Boxwood Dr., Corvallis, OR (US) 97330

( * ) Notice: Subject to any disclaimer, the term of this patent is extended or adjusted under 35 U.S.C. 154(b) by 292 days.

(21) Appl. No.: 11/052,606

(22) Filed: Feb. 7, 2005

(65) Prior Publication Data
US 2006/0176555 A1    Aug. 10, 2006

(51) Int. Cl.
| | |
|---|---|
| G03B 21/56 | (2006.01) |
| G03H 1/00 | (2006.01) |
| G02F 1/295 | (2006.01) |
| G02B 6/26 | (2006.01) |
| G02B 6/02 | (2006.01) |
| G02B 6/036 | (2006.01) |
| H04B 10/00 | (2006.01) |
| H04B 10/12 | (2006.01) |
| F21V 7/04 | (2006.01) |

(52) U.S. Cl. .................. 359/460; 359/443; 359/34; 385/4; 385/32; 385/50; 385/142; 385/144; 398/139; 398/178; 398/142; 362/610; 362/615

(58) Field of Classification Search ................ 359/460, 359/443, 34; 385/4, 32, 50, 123–128, 142, 385/144, 146; 398/139, 178, 141–142; 362/610, 362/615, 511
See application file for complete search history.

(56) References Cited

U.S. PATENT DOCUMENTS

| | | | | |
|---|---|---|---|---|
| 2,825,260 | A | * | 3/1958 | O'Brien ...................... 385/116 |
| 3,279,942 | A | * | 10/1966 | Granitsas et al. ............. 427/58 |
| 4,090,104 | A | * | 5/1978 | Vann et al. .................. 313/422 |
| 4,693,552 | A | * | 9/1987 | Jeskey ......................... 385/116 |
| 4,929,048 | A | | 5/1990 | Cuypers |
| 5,150,445 | A | * | 9/1992 | Toyoda et al. ............... 385/116 |
| 5,400,424 | A | | 3/1995 | Williams |
| 6,144,791 | A | * | 11/2000 | Wach et al. ................. 385/123 |
| 6,195,016 | B1 | | 2/2001 | Shankle et al. |
| 6,418,254 | B1 | * | 7/2002 | Shikata et al. .............. 385/116 |
| 6,455,860 | B1 | * | 9/2002 | Mooney ...................... 250/397 |
| 6,571,043 | B1 | | 5/2003 | Lowry et al. |

* cited by examiner

*Primary Examiner*—Diane Lee
*Assistant Examiner*—Magda Cruz

(57) ABSTRACT

Provided is a black matrix light guide screen display. In a particular embodiment, provided are a plurality of aligned light guides, each having an input end, a midsection and a magnifying output end. A black matrix material is disposed adjacent to the light guides proximate to the magnifying output ends. The plurality of aligned light guides are arranged into a plurality of light guide layers, each layer one light guide thick. The magnifying output ends of each layer are aligned in substantially contiguous parallel contact with interposed black spacers to provide substantially the same magnification vertically and horizontally.

39 Claims, 6 Drawing Sheets

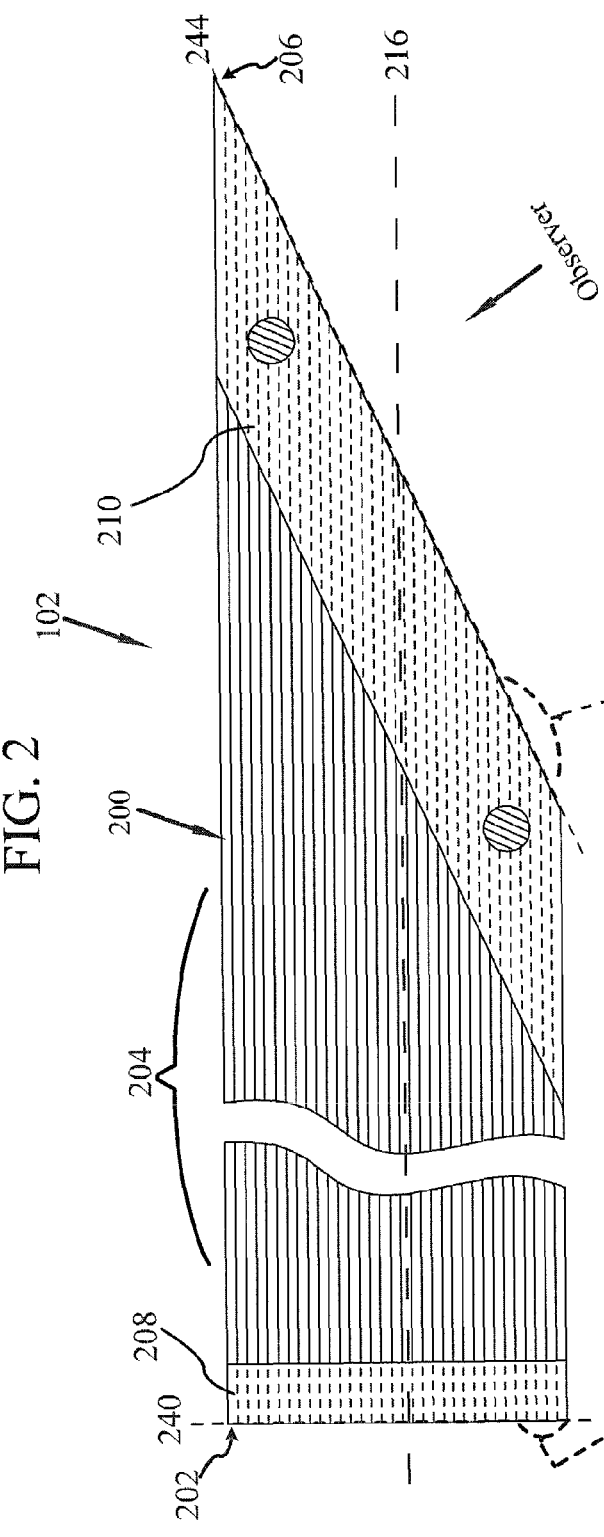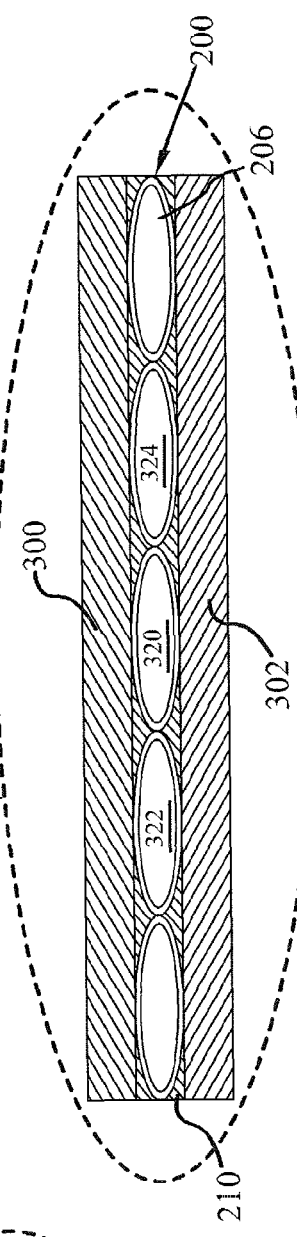

BLACK MATRIX LIGHT GUIDE SCREEN DISPLAY

RELATED APPLICATIONS

This application is related to commonly owned U.S. patent application Ser. No. 10/698,829, filed on Oct. 31, 2003 by inventors Huei Pei Kuo, Lawrence M. Hubby, Jr. and Steven L. Naberhuis and entitled "Light Guide Apparatus For Use In Rear Projection Display Environments", herein incorporated by reference.

FIELD

This invention relates generally to the field of display devices, and more particularly to screens and related hardware employed in rear projection display devices.

BACKGROUND

Socially and professionally, most people rely upon video displays in one form or another for at least a portion of their work and/or recreation. With a growing demand for large screens and high definition television (HDTV), cathode ray tubes (CRTs) have largely given way to displays composed of liquid crystal devices (LCDs), light-emitting diodes (LEDs), plasma and front and rear projection systems.

A CRT operates by a scanning electron beam exciting phosphorous-based materials on the back side of a transparent screen, wherein the intensity of each pixel is commonly tied to the intensity of the electron beam. With an LED and plasma display, each pixel is an individual light-emitting device capable of generating its own light. With an LCD display, each pixel is a transient light-modulating device, individually adjusted to permit light to shine through the pixel.

As neither system utilizes a large tube, LCD, plasma and LED screens may be quite thin and often are lighter than comparable CRT displays. The individual nature of each pixel of an LED, plasma or LCD display introduces the possibility that each pixel may not provide the same quantity of light. One pixel may be brighter or darker than another, a difference that may be quite apparent to the viewer.

The human eye is able to perceive subtle differences in light intensity. This poses a challenge to display manufacturers. If the pixels in a display vary greatly in their light-emitting ability, the display will be unacceptable to users.

To avoid such discrepancies in performance, great care is generally applied in the fabrication of LED, plasma and LCD displays in an attempt to ensure that the pixels are as uniform and consistently alike as is possible. Frequently, especially with large displays, quality control measures discard a high percentage of displays before they are fully assembled. As such, displays are generally more expensive than they otherwise might be, as the manufacturers must recoup the costs for resources, time and precise tooling for both the acceptable displays and the unacceptable displays.

Projection systems offer alternatives to LED, plasma and LCD based systems. In many cases, projection display systems are less expensive than comparably sized LED, plasma and LCD display systems. With a front projection system, the image is projected onto a screen from the same side as the viewer. If the viewer stands, sits or otherwise blocks the projection the image will be compromised. Front projection systems are therefore often suspended from the ceiling or mounted high upon a rear wall.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below-average picture quality in certain environments. For example, rear projection displays may be difficult to see when viewed from particular angles within a room setting or when light varies within the environment. Aside from a theatrical setting, light output and contrast are constant issues in most settings and viewing environments.

Despite advancements in projectors and enhanced lens elements, the lens and reflector design remains generally unchanged and tends to be a limiting factor in both picture quality and overall display system thickness.

A display may also have to contend with two types of contrast—dark room contrast and light room contrast. Dark room contrast is simply the contrast between light and dark image objects in a dark environment such as a theater setting. Light room contrast is simply the contrast between light and dark image objects in a light environment. Front projection systems typically provide good dark room contrast where ambient light is minimized but, as they rely on a screen reflector, they are subject to poor light room contrast due to the interference of ambient light.

Rear projection displays, LED, LCD and plasma typically provide better light room contrast than front projection systems. However, ambient light striking the viewing surface can be an issue for viewers and buying consumers. Ambient light is oftentimes highly variable. For typical consumers, what makes a display attractive is often high contrast in a bright room.

A developing variation of rear projection displays utilizes light guides, such as optical fibers, to route an image from an input location to an output location, and to magnify the image. Such displays may be referred to as light guide screens ("LGS"). Light room contrast and dark room contrast are generally issues that also apply to LGS systems.

Weight, thickness, durability, cost, aesthetic appearance and quality are key considerations for rear projection display systems and display screens. From the manufacturing point of view, cost of production and increased yield are also important.

Hence, there is a need for a rear projection display that overcomes one or more of the drawbacks identified above.

SUMMARY

This invention provides black matrix light guide screen displays.

In particular, and by way of example only, according to an embodiment of the present invention, provided is black matrix light guide screen display including: a plurality of aligned magnifying light guide layers providing a viewing surface, each layer including: a plurality of aligned light guides, each having an input end, a midsection and a magnifying output end; the plurality of magnifying output ends aligned in substantially contiguous parallel contact; and a black matrix material disposed adjacent to the plurality of magnifying output ends.

BRIEF DESCRIPTION OF THE DRAWINGS

FIG. 2 is a plan view of a magnifying layer incorporated in the display shown in FIG. 1;

FIG. 3 provides end views of the input end and magnifying output end of the magnifying layer shown in FIG. 2;

DETAILED DESCRIPTION

Before proceeding with the detailed description, it is to be appreciated that the present teaching is by way of example, not by limitation. The concepts herein are not limited to use or application with a specific light guide screen. Thus, although the instrumentalities described herein are for the convenience of explanation, shown and described with respect to exemplary embodiments, it will be appreciated that the principles herein may be equally applied in other types light guide screen display systems.

Figure 1:
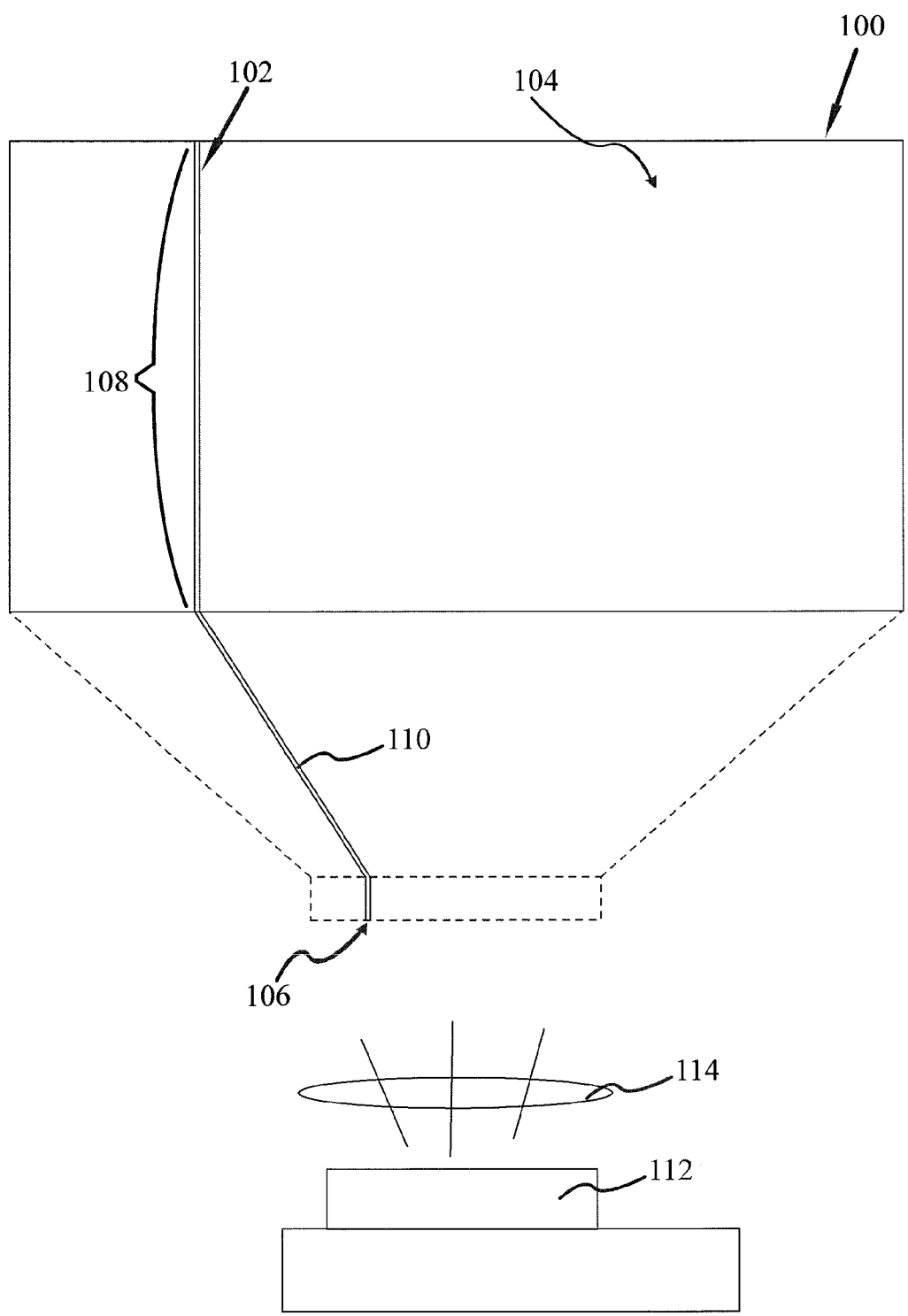
FIG. 1 shows a schematic diagram of an embodiment of a light guide screen display.

Referring now to the drawings, and more specifically to FIG. 1, presented is a conceptual illustration of a portion of a light guide screen ("LGS") display 100 incorporating a black matrix. In at least one embodiment, the LGS display 100 has a plurality of aligned magnifying light guide layers 102 (hereinafter, "magnifying layers 102"), providing a viewing surface 104. Each magnifying layer 102 provides an input location 106, a midsection 110 and an output location 108. The output location 108 is configured to provide magnification relative to the input location 106. Whereas FIG. 1 illustrates a single magnifying layer 102 for ease of discussion and the introduction of components, FIG. 6 may be referred to as a more complete rendering of LGS display 100 with a plurality of magnifying layers 102.

As shown, in at least one embodiment, each magnifying layer 102 is continuous vertical slice across the viewing surface 104 of LGS display 100. In an alternative configuration (not shown), each magnifying layer 102 is a continuous horizontal slice across the viewing surface 104 of LGS display 100. An image is projected upon input location 106. Such an image may be provided in at least one embodiment by an image source 112 proximate to the input location 106. A lens 114 may optically couple the at least one image source 112 to the input location 106, or the lens 114 may be an integral part of the image source 112.

Image source 112 may be any device capable of providing a visual image, such as, for example, a projector. Image source 112 is not limited simply to this example, and may also include combinations of devices. For example, multiple light/image sources (such as red, green and blue illuminated liquid crystal light valves) may be used as well. As is further explained below the image focused upon the input location 106 is expanded to appear upon the viewing surface 104.

As shown in FIG. 2, each magnifying layer 102 has a plurality of light guides 200. It is understood and appreciated that light guides 200 as used herein are cladded light guides. Each light guide 200 consists of a core that is substantially optically clear and a circumferential cladding, further discussed below with respect to FIG. 4. The core has an index of refraction, n1, and the clad has an index of refraction n2, wherein n1>n2.

Each light guide 200 has an input end 202, a midsection 204 and a magnifying output end 206. In at least one embodiment, the midsection 204 is a flexible midsection. Each magnifying output end 206 is configured to magnify an image presented to the input end 202. The plurality of magnifying output ends 206 are aligned in substantially contiguous parallel contact.

More specifically, the magnifying output ends 206 are in substantially contiguous intimate contact, without intervening spacers or material separating each individual magnifying output end 206 from its neighbors on either side. In other words, the magnifying output ends 206 lie next to one another and are in actual contact, touching along their outer surfaces at a point.

As is further illustrated and described below with reference to FIGS. 3 and 4 (illustrating light guide core 400 and cladding 402), it is understood and appreciated that the light conveying cores of each light guide are not in contact; rather, it is the cladded outer surfaces that are in contact. Moreover, over the course of each entire length, the core of one light guide 200 will not contact the core of another light guide 200.

FIG. 2 illustratively shows thirty-three light guides 200 shown as optical fibers for ease of discussion and conceptualization. Embodiments may employ more or fewer light guides 200. Preferably, light guides 200 are in substantially contiguous parallel contact particularly in the aligned input ends 202 and aligned output ends 206; however, due to limitations in manufacturing, instances may arise where a small amount of space might exit between one or more light guides 200. However the majority of light guides 200 are intended to be in substantially contiguous parallel contact. The midsections 204 of the light guides 200 may not be necessarily in contiguous contact.

In at least one embodiment, the aligned input ends 202 define a portion of dotted line 240. It is this portion of line 240 that serves as the input location 106 of the magnifying layer 102 shown in FIG. 1.

Black matrix material 208 is disposed adjacent to light guides 200 proximate to the aligned input ends 202. In at least one embodiment, black matrix material 208 is a black matrix bonding material, bonding the aligned input ends 202. The black matrix material 208 bonding the input ends 202 may be more easily perceived in the enlarged end view bounded by dotted line 242.

Similarly, in at least one embodiment, a black matrix material 210, is disposed adjacent to aligned magnifying output ends 206 of light guides 200. In at least one embodiment, black matrix material 210 is a black matrix bonding material, bonding the aligned magnifying output ends 206 into a uniform line defining a portion of dashed line 244. Further, in at least one embodiment, black matrix material 208 is substantially the same as black matrix material 210.

In at least one embodiment, spacers are disposed between each magnifying layer 102. FIG. 3 illustrates a partial enlarged view of five magnifying output ends 206 shown in FIG. 2. As shown in FIG. 3, a top spacer 300 and bottom spacer 302 are bonded to the aligned magnifying output ends. Top and bottom spacers 300, 302 are composed of black material. Moreover, top and bottom spacers 300 and 302 may be formed of substantially the same material as black matrix material 208 and/or 210.

The substantially contiguous parallel contact between the magnifying output ends 206 of light guides 200 may also be more fully appreciated. As shown, light guide 320 is in intimate contact with light guide 322, lying to the left and light guide 324, lying to the right.

"Black" may be defined as the visual impression experienced when no visible light reaches the human eye. This condition provides a contrast with white. Pigments that absorb light rather than reflect it back to the eye appear to be black. A black pigment may be a very dark shade of grey, or may be a combination of several pigments that collectively act to absorb all colors. Black material therefore, as used herein, is understood and appreciated to be material that does not reflect and/or substantially absorbs the majority of visible light incident upon the black material.

FIG. 1 does not illustrate the individual light guide elements of each magnifying layer 102; however, the uniform line of magnifying output ends 206 corresponds to the magnifying output location 108 shown in FIG. 1. The midsections 204 collectively are represented as midsection 110 and, as shown in FIG. 1, permit separate orientation/positioning of the input location 106 from the aligned magnifying output location 108. Where, as in at least one embodiment, the midsections 204 of light guides 200 are flexible, the midsections 110 of each magnifying layer 102 are also flexible. Such flexibility is preferred in at least one embodiment, so as to facilitate, for example, fabrication.

Figure 4:
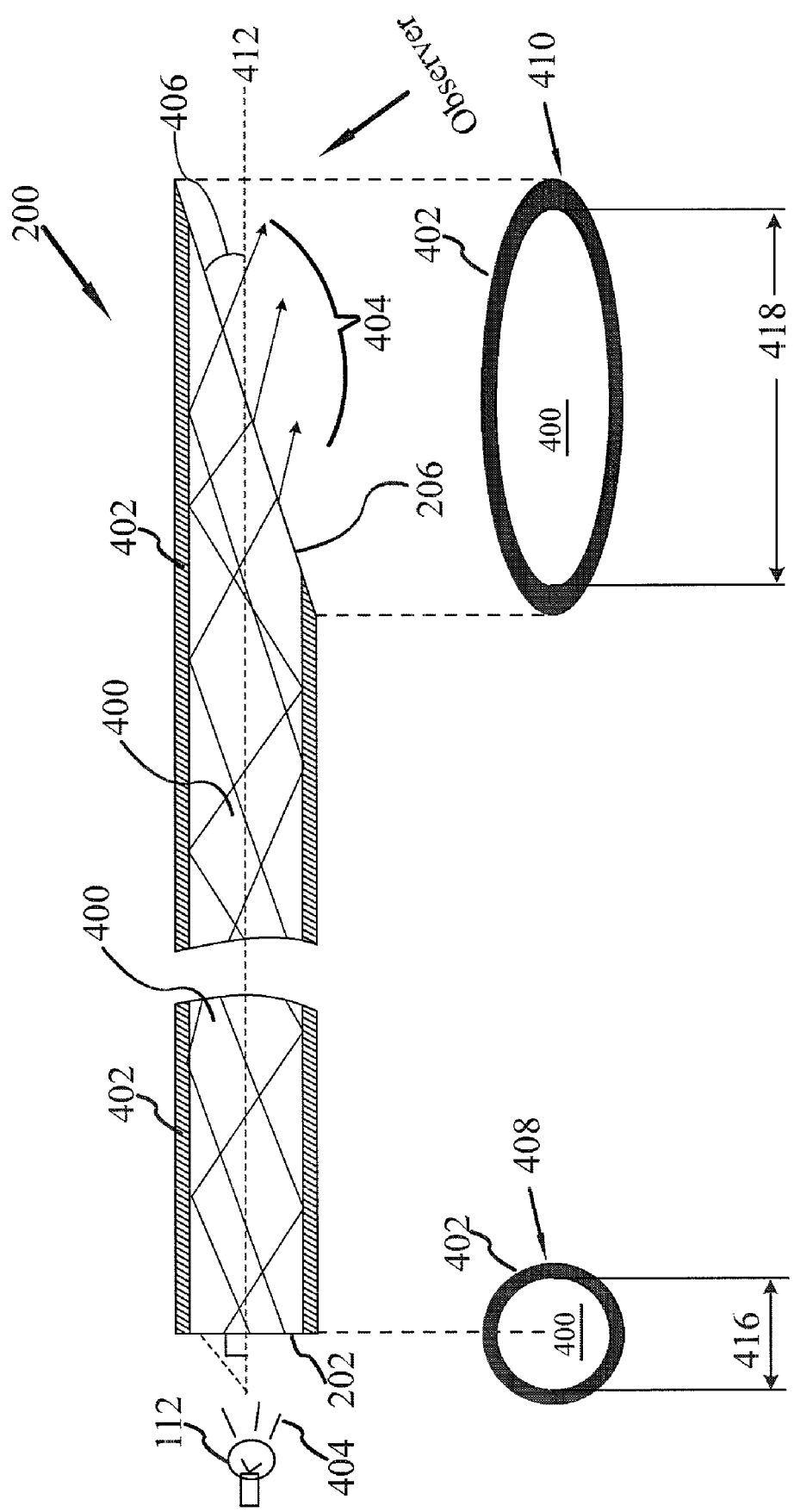
FIG. 4 is a partial cross-section view of a light guide as used in the magnifying layer of FIG. 2

FIG. 4 is an enlarged cross-section of a single light guide 200. Although illustrated as a rod, other light guide geometries may be employed such as, but not limited to, triangular, rectangular or hexagonal. In at least one embodiment, light guides 200 are optical fibers.

Each light guide 200 has a longitudinal light guide core 400 and an external circumferential cladding 402. Further, in at least one embodiment, cladding 402 is black cladding. Moreover, in at least one embodiment, light guides 200 are black-cladded optical fibers. It is of course realized that light guide 200 (if flexible) may bend, coil or otherwise contour such that longitudinal centerline 412 is not always a straight line. Light guide 200 is shown with core 400 symmetric about longitudinal centerline 412, for ease of discussion and illustration.

In at least one embodiment, the core 400 is formed of a generally optically clear plastic or plastic-type material, including but not limited to a plastic such as acrylic, Plexiglas, polycarbonate material and combinations thereof. In an alternative embodiment, the core 400 is formed of a generally optically clear glass.

In at least one embodiment, each light guide 200 is preferably substantially totally internally reflecting such that the light, illustrated as lines 404, received at the input end 202 is substantially delivered to the magnifying output end 206 with minimal loss. Cladding 402 is a material having a refraction index lower then that of the core 400. Total internal reflection, or TIR, is the reflection of all incident light off a boundary between cladding 402 and core 400. TIR occurs when a light ray is both in a medium of higher index of refraction and approaches a medium of lower index of refraction, and the angle of incidence for the light ray is greater than the "critical angle."

The critical angle is defined as the smallest angle of incidence measured with respect to a line normal to the boundary between two optical media for which light is refracted at an exit angle of 90 degrees—that is, the light propagates along the boundary—when the light impinges on the boundary from the side of higher index of refraction. For any angle of incidence greater than the critical angle, the light traveling through the medium with a higher index of refraction will undergo total internal reflection. The value of the critical angle depends upon the combination of materials present on each side of the boundary. In at least one embodiment, light guides 200 are black cladded TIR optical fibers.

As shown in FIG. 4, input end 202 is substantially perpendicular to longitudinal centerline 412. Magnifying output end 206 is angled relative to longitudinal centerline 412, at angle 406. As such, the horizontal width 416 of input end 202 is not as great as the horizontal width 418 of magnifying output end 206. In the embodiment shown, input end 202 has a substantially circular cross-section 408, while the magnifying output end 206 has a substantially elliptical cross-section 410

In at least one alternative embodiment, light guides 200 may have cross-sections relating to a square, triangle, octagon or other polygon.

Figure 5:
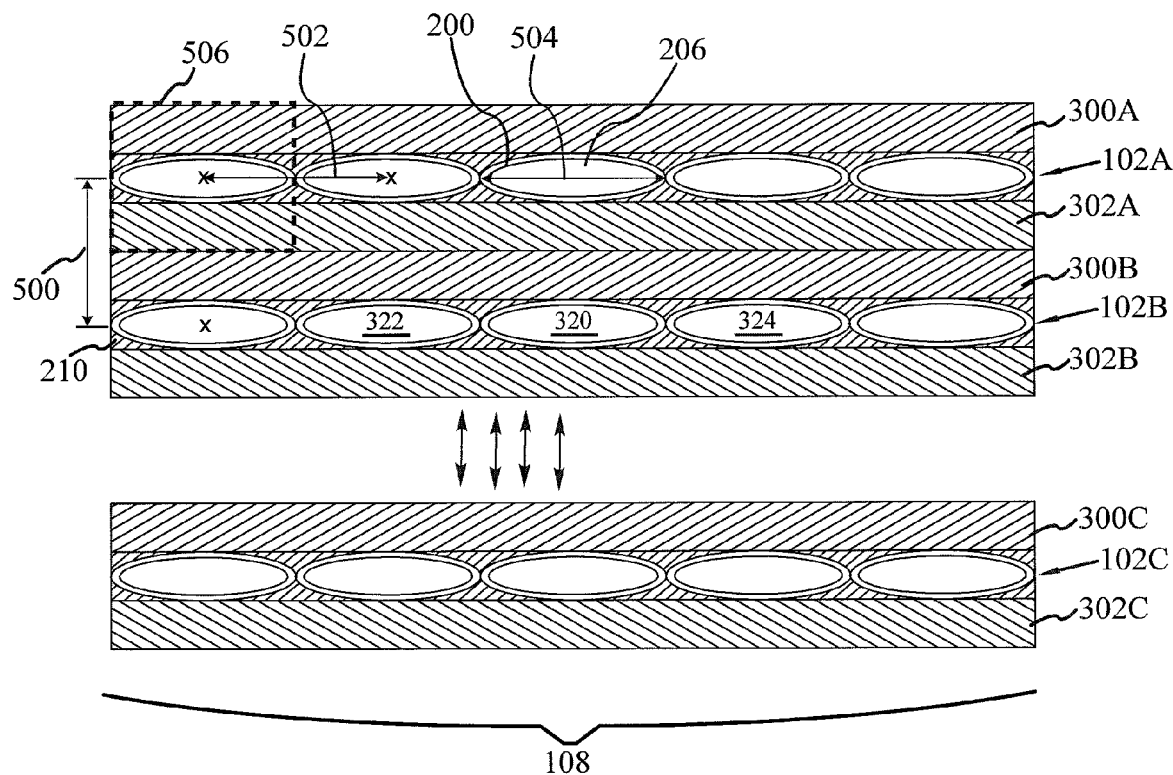
FIG. 5 is a partial cross-section view of the output ends of stacked magnifying layers according to an embodiment.
Figure 6:
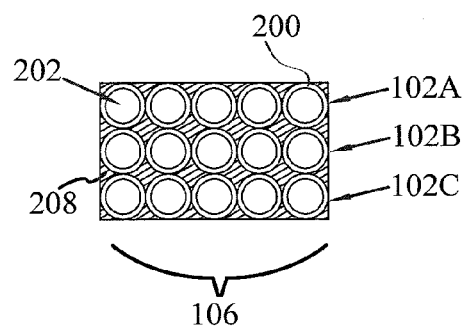
FIG. 6 is a partial end view of the input ends of stacked magnifying layers shown in FIG. 5.

With reference now to FIGS. 5 and 6, the magnification provided in at least one embodiment may be further appreciated. FIG. 6 provides an end view of the aligned input ends 202 of three magnifying layers 102A, 102B, 102C. Each layer shown includes five light guides 200 in substantially contiguous parallel contact. Further, the cross-section of each light guide 200 presents a circular input end 202 as illustrated with optical fibers.

FIG. 5 provides a cross-sectional view of three magnifying layers 102A, 102B, 102C along dashed line 244 in FIG. 2. As stated above, black matrix material 210 is disposed adjacent to output ends 206. LGS 100 is comprised of a plurality of magnifying layers 102. Black matrix material may be disposed between magnifying layers 102. Specifically, in at least one embodiment, the black matrix material between magnifying layers includes black top and bottom spacers 300, 302. Alternatively, spacers 300 and 302 could form a single spacer. Such a spacer would have substantially the same thickness as the sum of the thicknesses of the top and bottom spacers 300 and 302.

In at least one embodiment, black spacers 300, 302 are bonded to the aligned magnifying output ends 206 by the same black matrix bonding material used to bond the magnifying output ends 206 together. Further, substantially the same black matrix bonding material may be used to bond the plurality of magnifying layers 102 together. In at least one alternative embodiment, black matrix bonding material is disposed as spacers 300, 302 between magnifying layers 102. In other words, in at least one embodiment, black matrix bonding material and black matrix spacing material (such as black spacers 300, 302) are substantially the same type of material.

Each magnifying layer 102A, 102B, 102C is shown with five light guides 200 in substantially contiguous parallel contact. In the embodiment shown, top spacers 300 (e.g., top spacer 300A) and bottom spacers 302 (e.g., bottom spacer 302A) provide vertical spacing 500 between the center point "x" of each magnifying output end 206 that is substantially the same as the center-to-center spacing 502 between adjacent magnifying output ends 206. In addition, in at least one embodiment, the center-to-center spacing 502 is substantially identical to horizontal dimension 504 of each magnifying output end 206.

In such a configuration, the top and bottom spacers 300, 302 provide apparent vertical magnification that is substantially the same as the horizontal magnification provided by each magnifying output end 206. In at least one embodiment, each magnifying output end 206 represents a display pixel 506.

The viewing surface 104 of LGS 100 is largely composed of display pixels. In at least one embodiment, each display pixel is based upon the magnifying output end 206 of each light guide 200. As shown in FIG. 5, a pixel 506 (bounded by dotted line) includes a portion of top spacer 300A and bottom spacer 302A.

FIG. 5 as drawn therefore conceptually represents the apparent magnification provided by the magnifying output ends 206 over the input ends 202. In alternative embodiments, the top and bottom spacers 300, 302 may provide more or less spacing, thus providing more or less apparent vertical magnification as illustrated. As in FIG. 3, the substantially contiguous parallel contact between magnifying output ends (for example 322, 320, 324) is again illustrated.

It is further understood and appreciated that the light guide 200, top black spacers 300, bottom black spacers 302, black matrix bonding materials 208, 210 and other components are drawn in an exaggerated scale for ease of discussion. In addition, the conventions of vertical and horizontal are used with reference to the orientation of the elements within each figure for ease of discussion.

In at least one embodiment the light guides 200 may each be one hundred micrometers in diameter. Where angle 406 (shown in FIG. 4) is five degrees (5°), the horizontal magnification of the magnifying output end 206 over the input end 202 is about a factor of ten. Utilizing top and bottom spacers 300, 302, each with a thickness of four hundred and fifty micrometers, gives a vertical magnification of about a factor of ten. Alternatively, a single spacer of nine hundred micrometers could provide the spacing between pairs of magnifying layers 102 at their output ends 206.

In a typical display screen, visual images are represented by a plurality of individual light points, commonly referred to as pixels. Each pixel may provide the same or different light as its neighbor pixels. As a whole, it is the patterns established by the varying lights provided by the pixels that are perceived by observers as shapes, pictures and images.

Due to the small size of each pixel and/or the distance between the observer and the display, the independent nature of each pixel is not observed or perceived by the unaided eye. A typical standard TV display provides a vertical to horizontal resolution of 480:640 with about 307,200 pixels. A typical HDTV screen provides a vertical to horizontal resolution of 1080:1920 with about 2,116,800 pixels—a more than six-fold increase in pixels over a traditional TV display.

Figure 7:
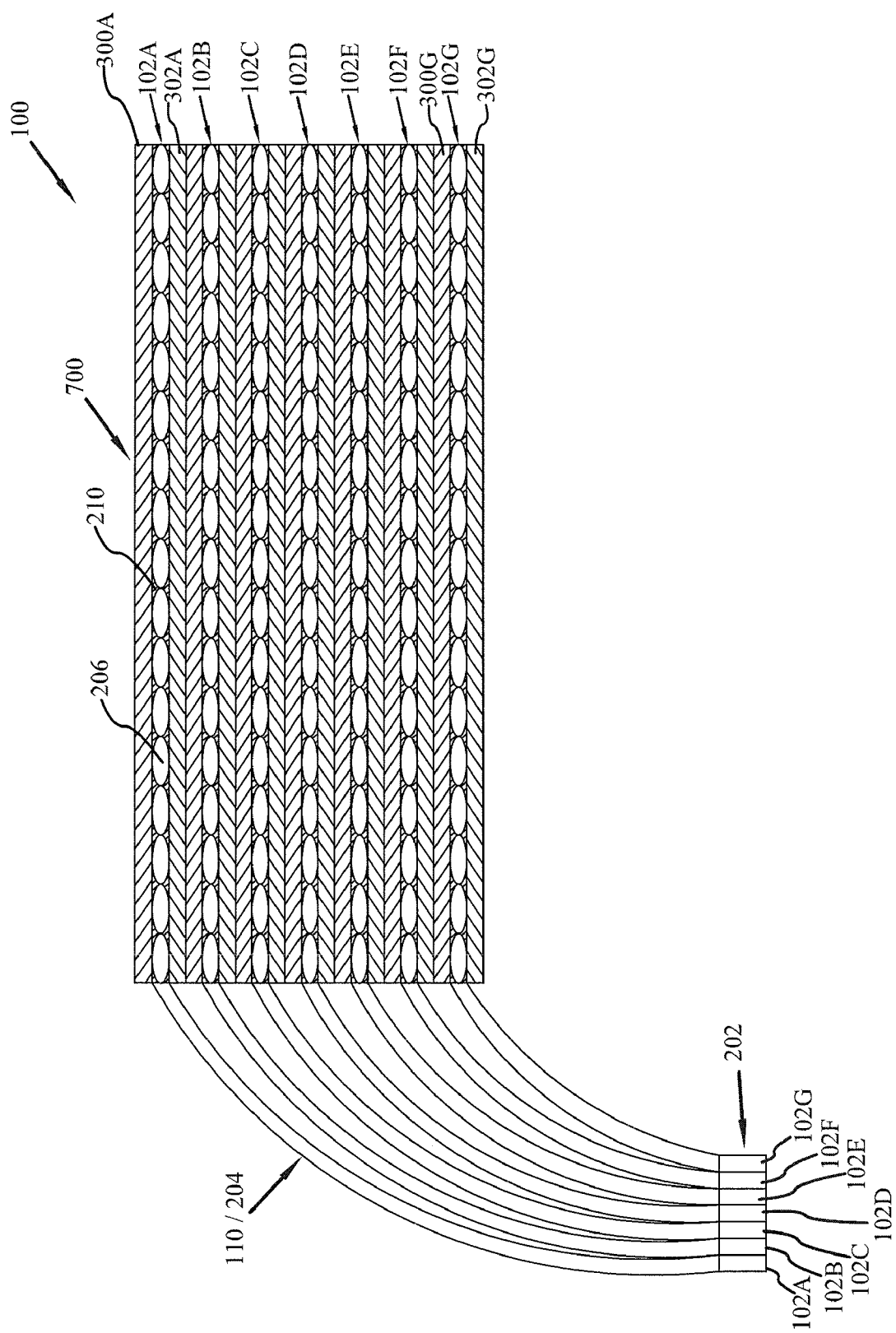
FIG. 7 is a partial plan view of the stacked magnifying layers providing a viewing surface and image input location.

FIG. 7 is an enlarged portion of LGS 100, showing magnifying layers 102A~102G. Black matrix material, such as black matrix top spacers 300A, 300G black matrix bottom spacers 302A, 302G and black matrix material 210, providing viewing surface 700. Viewing surface 700 is a portion of viewing surface 104 shown in FIG. 1. The midsections 110 permit aligned input ends 202 to be oriented differently from viewing surface 700. In at least one embodiment, such separate alignment is advantageous in permitting a large HDTV display, such as a fifty inch display, to have a thickness of about four inches. Depending on the cross-sectional dimensions of the light guides and the resolution of the screen, light guide screens could be thinner or thicker than four inches. Reasonable thicknesses between one and six inches could be realized for television displays.

Where, as in at least one embodiment, the midsections 204 of light guides 200 are flexible, the midsections 110 of each magnifying layer 102 are also flexible. Such flexibility is preferred in at least one embodiment, so as to facilitate, for example, ease of installation, maintenance, cleaning and/or fabrication.

As may be appreciated with respect to FIG. 7, the black matrix 210 may occupy a substantial portion of the surface area of viewing surface 700. In at least one embodiment, the black matrix 210 may account for about 90% of viewing surface 700. The black matrix materials, such as black matrix top black spacers 300A, 300G black matrix bottom black spacers 302A, 302G and black matrix material 208, 210 absorb ambient light incident upon viewing surface 700.

The black matrix materials may also absorb internal light and prevent it from propagating to the viewing surface 700. Internal light may exist and/or emanate from a variety of sources. For example, wayward light may stray from a damaged light guide 201, a system LED, a work light, and/or ambient external light at the rear of the display through vents, incomplete seams or cracks. For both internal and external ambient light, the black matrix materials enhance the contrast of viewing surface 700. Such enhanced contrast may advantageously provide high light room contrast to LGS 100.

As discussed above, and with respect to FIG. 4, each light guide 200 has a core 400 and a cladding 402. A TIR property for the light guide 200 is achieved by providing a cladding with a lower index of refraction then the index of refraction of the core 400. It is possible, due to stress, time, age, physical abuse, wear or other factors, that one or more light guides 200 may incur damage to its cladding 402. Light may then escape from one light guide 200 and inadvertently enter another light guide 200. Such an event is known as cross talk between light guides 201. By providing black cladding 402, black material 208, 210, black spacing material (e.g., black matrix top black spacers 300A, 300G and black matrix bottom black spacers 302A, 302G) and combinations thereof, cross talk between light guides 200 may be significantly reduced, for the black materials may absorb the unintended stray light leaked from a damaged light guide 200.

Figure 8:
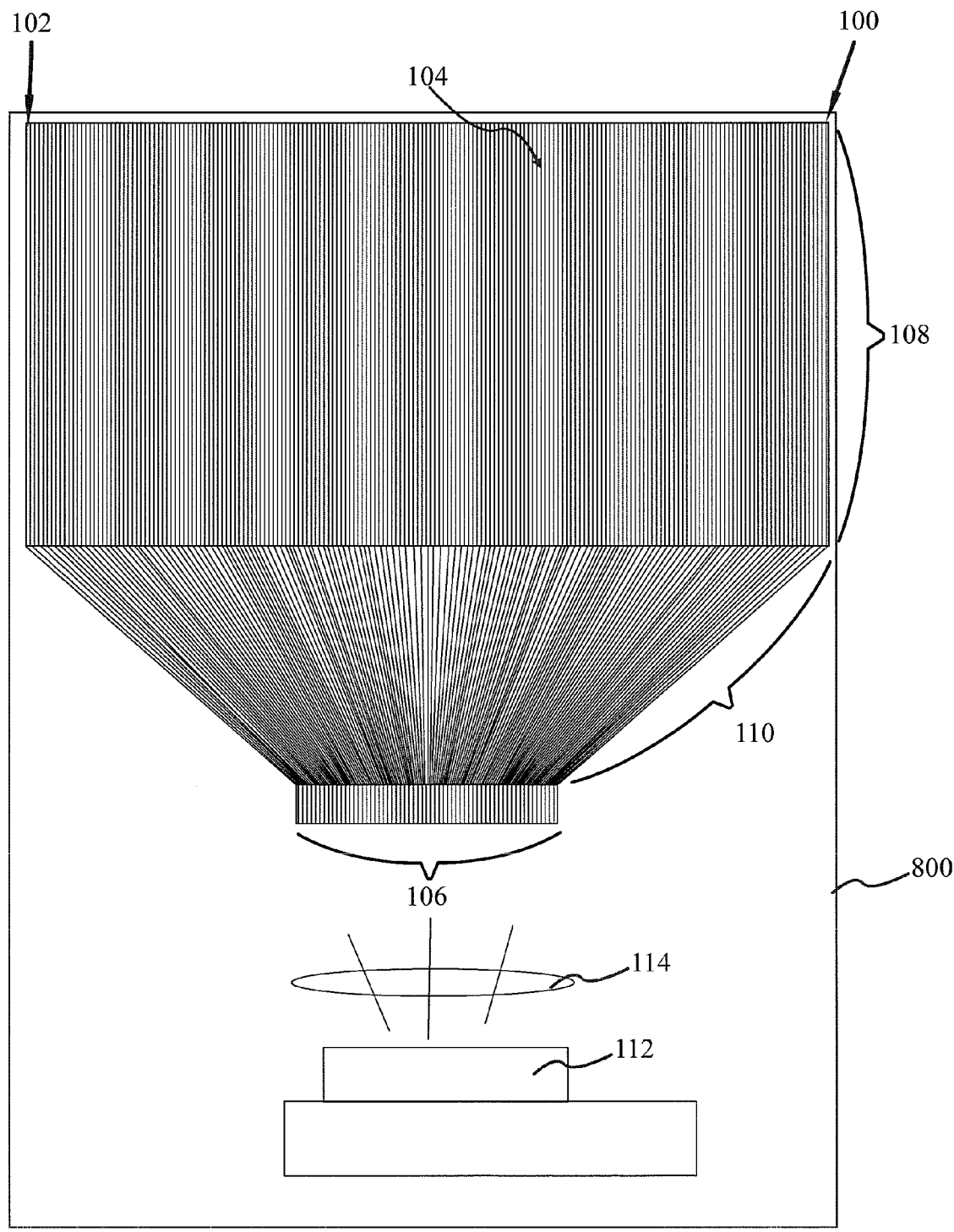
FIG. 8 shows a schematic diagram of an embodiment of a light guide screen with black matrix complete with a case.

FIG. 8 is a variation of FIG. 1, showing the plurality of magnifying layers 102 providing viewing surface 104. In addition, LGS 100 with black matrix, at least one lens 114 and at least one image source 112 are shown within a case 800. Alternatively the lens 114 could be integrated with the image source 112. In such an embodiment, a low cost, high quality, high resolution HDTV display may be provided. Such a system, being largely composed of plastic light guides, will likely be substantially lighter than comparable LED, LCD or plasma HDTV displays.

With respect to FIGS. 1 and 8, various visual image projectors are known in the art. Some employ pixel systems, while others may utilize directed visible lasers or vector line plotting systems. The selection of a particular type of image source 112 is a matter of fabrication preference and intended purpose for the LGS 100. For a HDTV embodiment, an appropriate image source 112 should be selected to render a high definition image upon the collective input location 106.

By disposing black matrix material 208 adjacent to the input ends 202 (see FIG. 2), the collective input locations 106 of magnifying layers 102 will receive light through the plurality of light guide cores 400 (FIG. 4) and absorb the remaining light not falling upon an exposed core 400. The absorption of this light may be advantageous in reducing internal ambient light.

With respect to the above description and discussion of black matrix material, in at least one embodiment, the black matrix materials such as, for example, black cladding 402, black matrix material 208, 210 and black spacers 300, 302, are fabricated from black materials. In an alternative embodiment, the black matrix materials have colorant specifically, a black colorant. In at least one embodiment, the colorant may be selected from the group consisting of carbon, black carbon, ink, pigment, dye and combinations thereof.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A black matrix light guide screen display comprising:
a plurality of aligned magnifying light guide layers providing a viewing surface, each layer including:
a plurality of aligned light guides, each having an input end, a midsection and a magnifying output end;
the plurality of magnifying output ends aligned in substantially contiguous parallel contact; and
a black matrix material disposed adjacent to the plurality of magnifying output ends and adjacent to the plurality of input ends.

2. The black matrix light guide screen display of claim 1, further comprising black spacers between the plurality of aligned magnifying light guide layers.

3. The black matrix light guide screen display of claim 1, further comprising black matrix bonding material between the plurality of aligned magnifying light guide layers proximate to the viewing surface.

4. The black matrix light guide screen display of claim 1, wherein each light guide further comprises a core and a black cladding about the core.

5. The black matrix light guide screen display of claim 4, wherein the black cladding reduces cross talk between light guides.

6. The black matrix light guide screen display of claim 1, wherein the black matrix material reduces cross talk between light guides.

7. The black matrix light guide screen display of claim 1, wherein the midsection of each light guide is flexible.

8. The black matrix light guide screen display of claim 1, wherein each light guide is a black cladded optical fiber.

9. The black matrix light guide screen display of claim 1, wherein the black matrix absorbs ambient light incident upon the viewing surface, thereby enhancing contrast of the viewing surface.

10. The black matrix light guide screen display of claim 1, wherein the black matrix material absorbs stray internal light, thereby enhancing contrast of the viewing surface.

11. The black matrix light guide screen display of claim 1, wherein each light guide is totally internally reflecting.

12. The black matrix light guide screen display of claim 1, wherein the black matrix material further comprises colorant.

13. The black matrix light guide screen display of claim 12, wherein the colorant is selected from the group consisting of carbon, black carbon, ink, pigment, dye and combinations thereof.

14. A black matrix light guide screen display comprising:
a plurality of aligned light guides, each having an input end, a midsection and a magnifying output end, the plurality of output ends providing a viewing surface; and
black matrix material disposed adjacent to the light guides proximate to the magnifying output ends and adjacent to the plurality of input ends;
wherein the plurality of aligned light guides are arranged into a plurality of light guide layers, each layer one light guide thick, the magnifying output ends of each layer aligned in substantially contiguous parallel contact.

15. The black matrix light guide screen display of claim 14, wherein the black matrix material provides spacing between the plurality of light guide layers.

16. The black matrix light guide screen display of claim 14, wherein the black matrix material is a bonding material.

17. The black matrix light guide screen display of claim 14, wherein the black matrix material absorbs ambient light incident upon the viewing surface.

18. The black matrix light guide screen display of claim 14, wherein the black matrix material absorbs stray internal light, thereby enhancing contrast of the viewing surface.

19. The black matrix light guide screen display of claim 14, wherein each light guide includes a core and a cladding about the core, wherein the cladding is black.

20. The black matrix light guide screen display of claim 14, wherein each light guide further comprises a black cladded optical fiber.

21. The black matrix light guide screen display of claim 14, wherein each light guide is totally internally reflecting.

22. The black matrix light guide screen display of claim 14, wherein the black matrix material comprises the majority of the viewing surface.

23. A black matrix light guide screen display comprising:
a plurality of aligned magnifying light guide layers, providing a viewing surface, each layer including:
a plurality of aligned light guides, each having an input end, a midsection, an output end and a longitudinal core, the input end being perpendicular to the core, the output end being acutely angled to the core, the output ends in substantially contiguous parallel contact;
black matrix material disposed adjacent to the output ends; and
black matrix spacing material disposed between the plurality of aligned magnifying light guide layers.

24. The black matrix light guide screen display of claim 23, wherein the black matrix spacing material and black matrix material are substantially the same type of material.

25. The black matrix light guide screen display of claim 23, wherein the black matrix spacing material and black matrix material have substantially the same light absorbing property.

26. The black matrix light guide screen display of claim 23, wherein the black matrix material is a bonding material.

27. The black matrix light guide screen display of claim 23, further comprising black matrix material disposed adjacent to the plurality of input ends.

28. The black matrix light guide screen display of claim 23, wherein the black matrix spacing material and black matrix material absorb light incident upon the viewing surface, thereby enhancing contrast of the viewing surface.

29. The black matrix light guide screen display of claim 23, wherein the black matrix material absorbs internal light, thereby enhancing contrast of the viewing surface.

30. The black matrix light guide screen display of claim 23, wherein each light guide is totally internally reflecting.

31. The black matrix light guide screen display of claim 23, wherein the black matrix material further comprises colorant.

32. The black matrix light guide screen display of claim 23, wherein each light guide is a black cladded optical fiber.

33. A black matrix light guide screen display comprising:
a case;
a plurality of aligned magnifying light guide layers providing a viewing surface at least partially disposed within the case, each layer including:
a plurality of aligned light guides, each having an input end, a midsection and a magnifying output end;
the plurality of input ends aligned as a row;
the plurality of magnifying output ends aligned in substantially contiguous parallel contact;
a black matrix material disposed adjacent to the magnifying output ends and adjacent to the plurality of input ends; and
at least one image source disposed within the case proximate to the aligned input ends.

34. The black matrix light guide screen display of claim 33, further comprising black matrix spacing material disposed between the plurality of aligned magnifying light guide layers proximate to the viewing surface.

35. The black matrix light guide screen display of claim 33, further comprising black matrix material disposed adjacent to the plurality of aligned input ends.

36. The black matrix light guide screen display of claim 33, wherein each light guide further comprises a core and a black cladding about the core.

37. The black matrix light guide screen display of claim 33, wherein the black matrix absorbs ambient light incident upon the viewing surface, thereby enhancing contrast of the viewing surface.

38. The black matrix light guide screen display of claim 33, wherein the black matrix material absorbs internal light, thereby enhancing contrast of the viewing surface.

39. The black matrix light guide screen display of claim 33, wherein each light guide is totally internally reflecting.

* * * * *

UNITED STATES PATENT AND TRADEMARK OFFICE
CERTIFICATE OF CORRECTION

PATENT NO. : 7,324,278 B2 Page 1 of 1
APPLICATION NO. : 11/052606
DATED : January 29, 2008
INVENTOR(S) : Huei-Pei Kuo et al.

It is certified that error appears in the above-identified patent and that said Letters Patent is hereby corrected as shown below:

On the title page, item (76), under "Inventors", in column 1, lines 2-3, delete "Laurence Meade Hubby, Jr." and insert -- Lawrence Meade Hubby, Jr. --, therefor.

Signed and Sealed this

First Day of July, 2008

JON W. DUDAS
*Director of the United States Patent and Trademark Office*